(12) United States Patent
Han et al.

(10) Patent No.: US 9,350,182 B2
(45) Date of Patent: May 24, 2016

(54) MULTI-PORT CHARGING DEVICE

(71) Applicants: Yun-Feng Han, Taipei (TW);
Wei-Chung Shih, Taipei (TW)

(72) Inventors: Yun-Feng Han, Taipei (TW);
Wei-Chung Shih, Taipei (TW)

( * ) Notice: Subject to any disclaimer, the term of this patent is extended or adjusted under 35 U.S.C. 154(b) by 201 days.

(21) Appl. No.: 14/210,464

(22) Filed: Mar. 14, 2014

(65) Prior Publication Data
US 2015/0263550 A1 Sep. 17, 2015

(51) Int. Cl.
*H01M 10/46* (2006.01)
*H02J 7/00* (2006.01)
*H02J 7/02* (2016.01)

(52) U.S. Cl.
CPC .............. *H02J 7/0042* (2013.01); *H02J 7/0013* (2013.01); *H02J 7/0047* (2013.01); *H02J 7/025* (2013.01)

(58) Field of Classification Search
CPC ....... H02J 7/0021; H02J 7/0042; H02J 7/025; H02J 7/0045; H02J 7/355; H02J 7/0047
USPC ................ 320/107, 108, 111, 114, 115, 149, 320/DIG. 21, 160
See application file for complete search history.

(56) References Cited

U.S. PATENT DOCUMENTS

| RE42,385 E * | 5/2011 | Wong et al. .................. 320/136 |
| 2008/0150480 A1* | 6/2008 | Navid ........................... 320/113 |
| 2012/0169272 A1* | 7/2012 | Khalepari ..................... 320/107 |
| 2014/0320064 A1* | 10/2014 | Chien ........................... 320/107 |
| 2014/0333263 A1* | 11/2014 | Stewart et al. ................ 320/111 |

* cited by examiner

*Primary Examiner* — Edward Tso

(57) ABSTRACT

A multi-port charging device for charging plural electronic devices simultaneously includes a body containing a circuit board that has plural current-detecting elements, a charging section including plural connecting ports each of which is connected to one of the electronic devices to be charged, wherein each of the connecting ports is associated with a lamp indicator and electrically connected to a current-detecting element, a power inlet port for connecting an external power source, a controlling section for selectively set a charging current for any of the connecting ports, and plural current-detecting elements for detecting charging currents of the electronic device, respectively, and feeding back a signal to the plural lamp indicators, so that each of the lamp indicators shows one of charging states according to the signal. The charging states at least include a fast charging mode, a slow charging mode, an off mode and a mis-connection mode.

12 Claims, 4 Drawing Sheets

MULTI-PORT CHARGING DEVICE

BACKGROUND OF THE INVENTION

1. Technical Field

The present invention relates to charging devices, and more particularly to a multi-port charging device that is able to charge multiple electronic devices simultaneously, to show real-time charging states, and to set charging currents.

2. Description of Related Art

Portable electronics are widely used in every level of our daily life. Taking data-accessing applications for example, the heavy printed documents can now be saved electronically for convenient and rapid access anytime, anywhere by using such as e-books, tablet computers, notebooks, smart phones and so on. Theses electronics are generally powered by rechargeable batteries contained therein.

For leveraging the advantage of portable electronics, many schools and organizations have replaced the traditional printed books with some of the above-mentioned devices, and particularly, with e-books. It is known that e-books need to be charged once a day if not more frequently for continuous operation. In a school scenario, it is more preferable to charge students' e-books simultaneously, for example, after school. However, it is often seen that the e-books are left overnight with the charger connected thereto and since the traditional charger is typically unable to tell whether the battery in the connected e-book is fully charged, electric current keeps running between the charger and the e-book as long as they are connected. Such a charging practice, over time, can cause damage to the components in the e-book and shorten the service life of the e-book, and can also be harmful to the charger itself. Another defect of the traditional charger is the lack of the function of identifying the real-time charging states. With this defect, a user is unable to know whether the charged device is sufficiently charged, and can be put in an awkward plight where he/she spends much time to wait for the device booting and finally recognizes that the remaining power level is not sufficient for the entire coming class. While some manufacturers therefore have developed some external instrument to be connected to the traditional charger for detecting the charging status of the charged electronic devices, the external instrument means additional costs and additionally burdensome operation. On the other hand, there are existing chargers equipped with indicator lamps for showing that charging is going on and that the battery is fully charged, but these existing chargers are unable to show the remaining power level through the lamps, so the user has no way to learn whether the battery is almost fully charged or is in an extremely low power state. There are even cases where an e-book or an electronic device is not properly connected to a charger and thus is not getting charged, but the charger still lights up its "charging" lamp. In these cases, the "charging" time is wasted in vain.

Hence, there is a need to address the shortcomings of the traditional and existing chargers by allowing a user to easily and rapidly identify real-time charging states of charged devices, so as to save power and protect electronics to be charged.

SUMMARY OF THE INVENTION

One objective of the present invention is to provide a multi-port charging device that charges through multiple ports simultaneously, and supports functions of showing charging states, saving power and protecting batteries in electronic devices it charges.

Another objective of the present invention is to provide a multi-port charging device that can selectively set and show charging currents for each of the electronic devices it charges.

To accomplish the above objectives, the disclosed multi-port charging device includes: a body, containing therein a circuit board that is provided with a plurality of current-detecting elements thereon; a charging section, being deposited at one side of the body and including a plurality of connecting ports each of which is connected to one said electronic device to be charged, in which each said connecting port has a lamp indicator provided at one lateral thereof and is electrically connected to one said current-detecting element; and a power inlet port, being deposited at an opposite side of the body and configured to be connected to an external power source for supplying power to the multi-port charging device, wherein each said current-detecting element detects a charging current of one said electronic device, and feeds back a signal to the connected lamp indicator, so that the lamp indicator shows one of charging states according to the signal, in which the charging states at least include a fast charging mode, a slow charging mode, an off mode and a mis-connection mode.

According to one preferred embodiment of the present invention, of the charging states, the fast charging mode refers to outputting a first current in a first time, and the slow charging mode refers to outputting a second current in the first time, in which the first current is greater than the second current, while the off mode refers to in the first time outputting a third current that is smaller than the second current or equal to zero.

According to another preferred embodiment of the present invention, the disclosed multi-port charging device further comprises a controlling section, which has a setting element and a displaying element, wherein each said connecting port has a unique port number, so that the one of connecting ports is allowed to be selected by the setting element, and the displaying element then shows the port number of the selected connecting port and a charging current associated therewith, and the setting element is further configured to set a maximum current and a minimum current for the selected connecting port.

According to another preferred embodiment of the present invention, the lamp indicators indicate different said charging states with different colors, or the lamp indicator flashes for the fast charging mode and the slow charging mode, and constantly illuminates for the off mode, while keeps dark for the mis-connection mode, wherein the lamp indicator flashes more frequently for the fast charging mode than for the slow charging mode.

The disclosed multi-port charging device uses the connecting ports to charge several electronic devices, and implements the lamp indicators to show the real-time charging states of the charged electronic device. It also allows the user to select one or more or all of the connecting ports through the controlling section and to make the maximum and minimum charging currents shown in the controlling section, so that the user can well learn the charging states of the electronic devices without using an additional, external device. Thus, the disclosed multi-port charging device can not only charge multiple electronic devices simultaneously, but also show current charging states of the charged electronic devices, and provide different charging currents for the connecting ports of different charging states, thereby saving power effectively and protecting the charged electronic devices from being run down due to excessive or prolonged charging.

DETAILED DESCRIPTION OF THE INVENTION

The present invention provides a multi-port charging device for charging plural electronic devices simultaneously. These electronic devices may be of the same type or of different types, such as e-books, mobile phones, notebooks, tablet computers and any rechargeable electronic devices.

Figure 1:
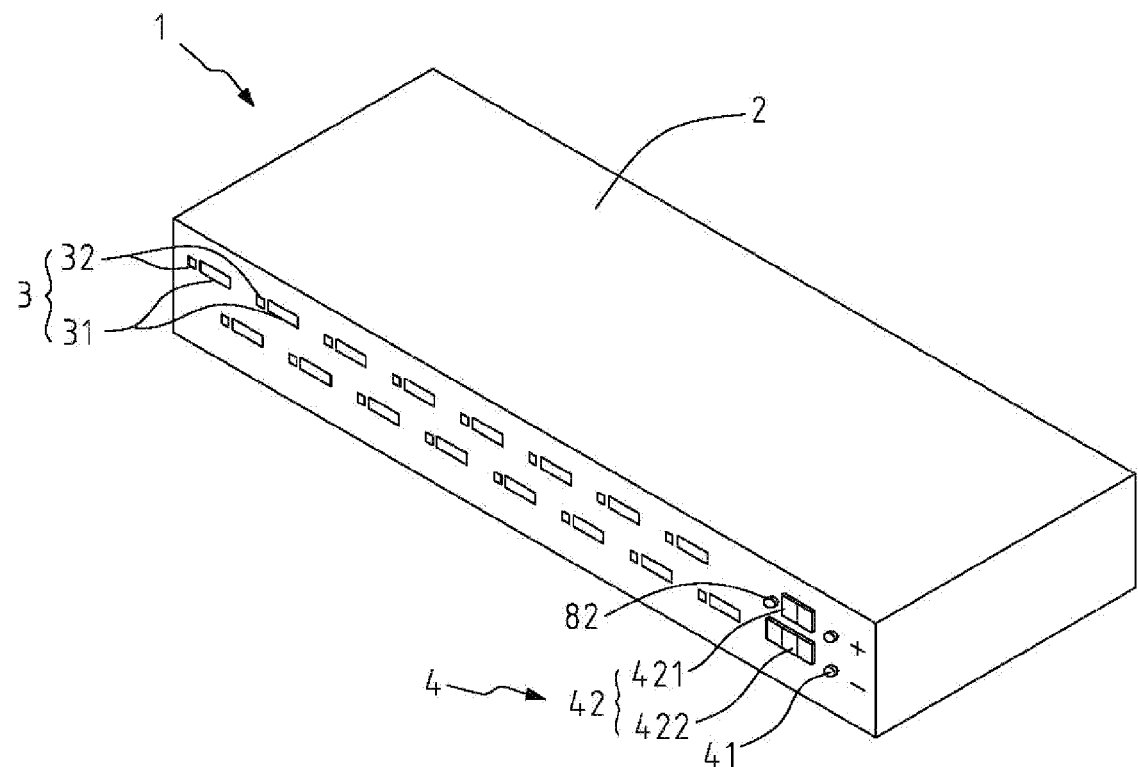
FIG. 1 is a perspective view of a multi-port charging device of the present invention.
Figure 2:
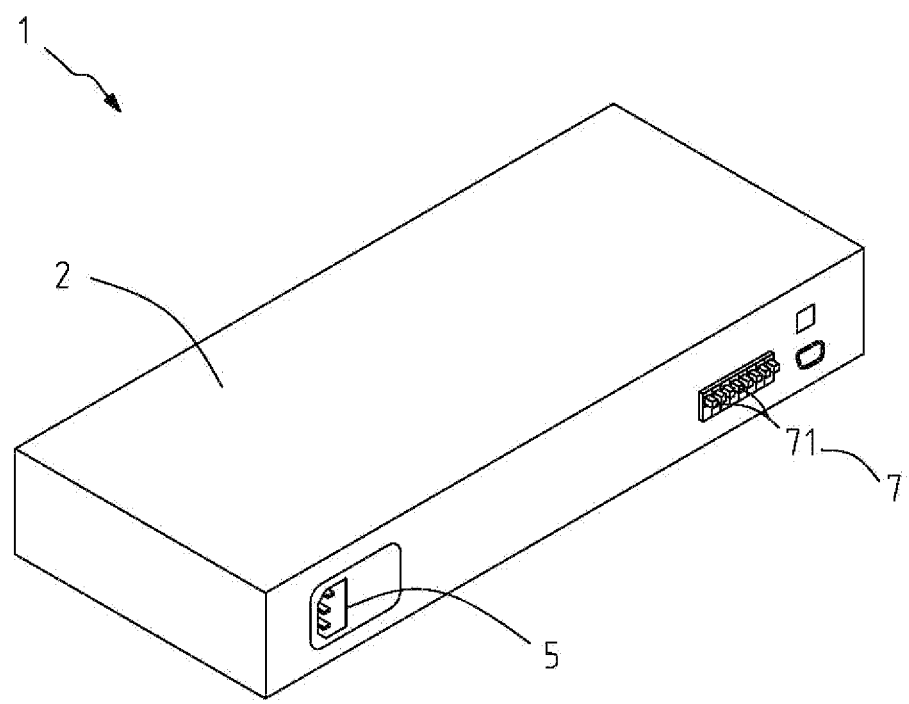
FIG. 2 is another perspective view of the multi-port charging device of the present invention taken from a different viewpoint.
Figure 3:
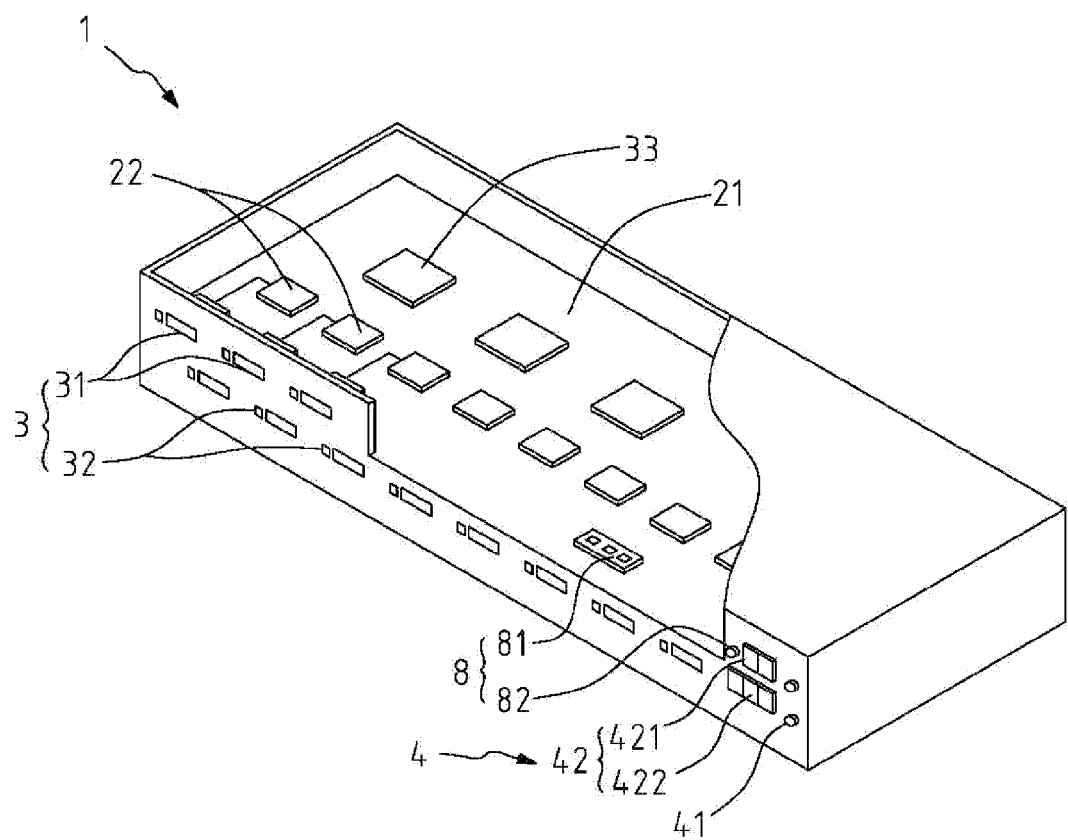
FIG. 3 is a partially cutaway drawing of the multi-port charging device of FIG. 1.

Please refer to FIG. 1 through FIG. 3 for a preferred embodiment of the multi-port charging device of the present invention. The disclosed multi-port charging device 1 comprises a body 2, a charging section 3, a controlling section 4 and a power inlet port 5 connected to an external power source 51 for supplying power to the multi-port charging device 1. The body 2 is a shell of the multi-port charging device 1, in which a circuit board 21 is fixed. The circuit board 21 is provided with a plurality of current-detecting elements 22. The body 2 has its one side provided with the charging section 3 and the controlling section 4, and has its opposite side provided with the power inlet port 5.

The charging section 3 comprises a plurality of connecting ports 31, for connecting the electronic devices 6 to be charged. In the present embodiment, the number of the connecting ports 31 is 16. Each of the connecting ports 31 is associated with a unique port number, i.e. one of the numbers from 01 to 16. In other words, the disclosed multi-port charging device 1 can simultaneously charge up to 16 electronic devices 6 simultaneously. However, in other embodiments, the number of the connecting ports 31 is not limited to 16 and may vary depending on the practical needs and on the size of the multi-port charging device 1. In the present embodiment, the connecting ports 31 are arranged into two staggered lines and are on the same side of the body 2. The connecting ports 31 shown herein are all have the USB interface for connecting electronic devices. However, in other embodiments, they may be a combination of different interfaces. For example, some of the connecting ports 31 may be of the Micro USB interface, some of them may be of the USB interface, and the rest of them may be of the dock connector specification (30-pin), for the use of Apple products (such as Ipad). It is to be noted that each of the connecting ports 31 is equipped with a lamp indicator 32 at one side thereof and is electrically connected to one said current-detecting element 22 (as shown in FIG. 3). In other words, each of the connecting ports 31 and each of the lamp indicators 32 are electrically connected to one said exclusively corresponding current-detecting element 22, so that the current-detecting element 22 can exclusively detect the charging current of one single electronic device.

Figure 4:
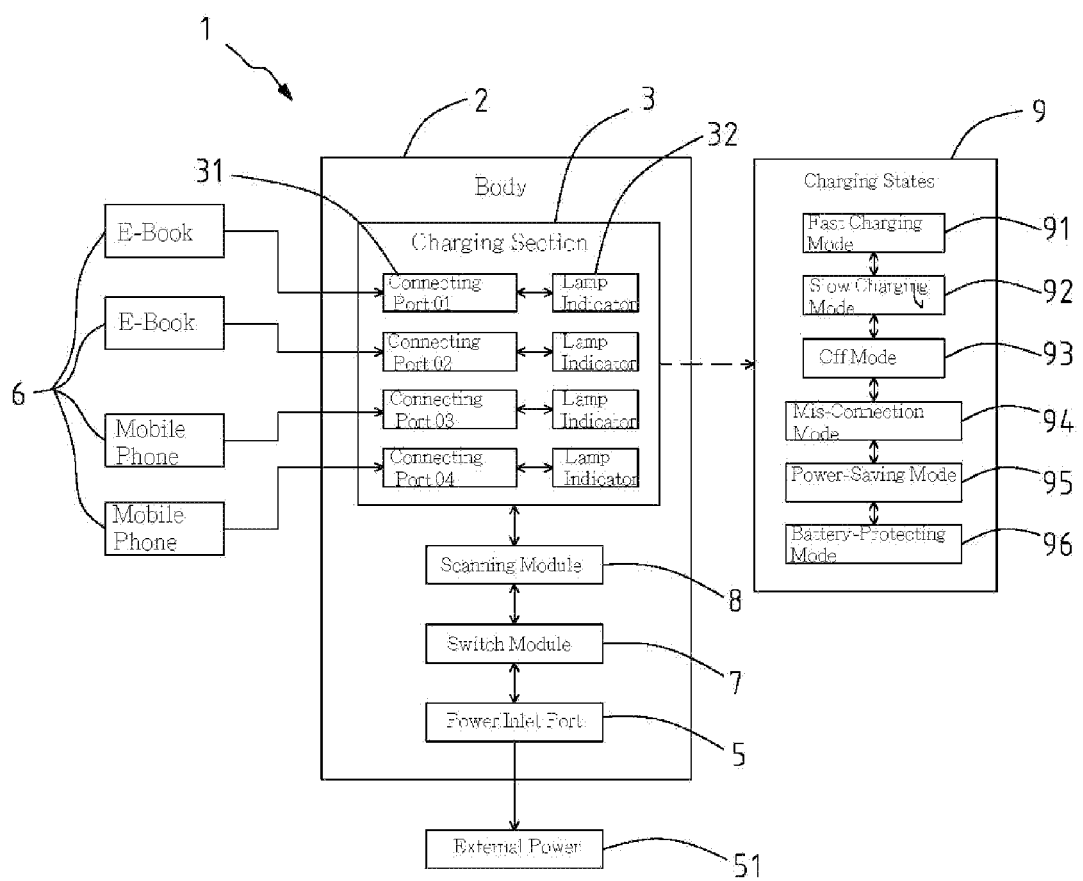
FIG. 4 is a block diagram illustrating charging structure of the disclosed multi-port charging device.

With the foregoing configuration, when the electronic devices 6 are connected to the connecting ports 31 for charging, the current-detecting elements 22 detect the charging currents of the electronic devices 6, respectively, and feedback a signal to the lamp indicators 32, so that each said lamp indicator 32 shows one of some charging states 9 according to the signal. The charging states 9 at least include a fast charging mode 91, a slow charging mode 92, an off mode 93 and a mis-connection mode 94 (as shown in FIG. 4). The fast charging mode 91 refers to outputting a first current in a first time. The slow charging mode 92 refers to outputting a second current in the first time. The first current is greater than the second current. The off mode refers to outputting a third current in the first time, wherein the third current is smaller than the second current or equal to zero. The mis-connection mode 94 indicates that the electronic device is not correctly connected and therefore is not getting charged. Particularly, the fast charging mode 91 indicates that the remaining power of the electronic device 6 is seriously low, such as lower than a half of its full power level, and thus the charging current is large for quick charging. The slow charging mode 92 indicates that the electronic device 6 still has some power but the power level is not full, so the charging current in the same time interval is smaller than that of the fast charging mode 91. The off mode 93 indicates that the electronic device 6 is fully charged, so the multi-port charging device 1 provides no more charging, meaning that the charging current is zero or kept at a minimum level.

The lamp indicators 32 may be designed to indicate the charging states 9 in many different ways. The lamp indicator 32 may be an LED. In one embodiment, the lamp indicators 32 use different colors to indicate different charging states. In another embodiment, the lamp indicator 32 flashes for the fast charging mode 91 and the slow charging mode 92, and constantly illuminates for the off mode 93, while it remains dark for the mis-connection mode 94. In this way, when a user see a lamp dark, he/she knows that the connection at the associated port fails and can rebuild the connection correctly. Therein, the lamp indicator 32 flashes more frequently for the fast charging mode 91 than for the slow charging mode 92, thereby distinguishing the two modes. Furthermore, different colors may be assigned for better recognition. Thereby, the disclosed multi-port charging device 1 may perform current detection based on the charging currents and then implement the lamp indicators 32 to show the corresponding charging states 9, for the user to easily and quickly identify whether the electronic device is currently fully charged (the off mode 93), not fully charged (the fast charging mode 91), almost fully charged (the slow charging mode 92) or not connected correctly (the mis-connection mode 94). The multi-port charging device 1 then considers the remaining power level of the electronic device 6 and determines the proper charging current, so as to save power and prevent the electronic device 6 from damage caused by overcharging, in turn protecting the electronic device.

Still referring to FIG. 1, the disclosed multi-port charging device 1 further comprises a controlling section 4, which is deposited besides the charging section 3, and includes a setting element 41 and a displaying element 42. The setting element 41 may be a set of setting keys, or a knob (not shown). The displaying element 42 includes plural screens 421 and 422 arranged vertically. In another embodiment, the displaying element 42 is a screen, such as a small-size LCD (not shown). Another feature of the present invention is that the setting element 41 serves to select any of the connecting ports 31, and the displaying element 42 serves to show the port number and the corresponding charging current of the selected connecting port 31. In practical operation, pressing the setting keys of the setting element 41 allows the screen 421 to show the port number of the selected connecting port 31, such as the port number 10. By pressing the setting element 41 again, the port number can be increased or decreased until the port number of the targeted connecting port 31 is reached. At the same time, the other screen 422 shows the charging current of the selected connecting port 31. For example, by showing "1400 mA", the screen 422 informs the user of a charging current of 1.40 ampere. Thereby, the user can get the charging state from the lamp indicator 32, and further get the accurate value of the charging current of the connecting port 31 from the displaying element 42. In addition, the setting element 4 may be also used to set the maximum current and the minimum current for the selected connecting port. The settings may be determined according to the electronic device to be charged, and done in the way described above. Particularly, the user can select a certain said connecting port 31, and press the setting keys of the setting element 41 to increase or decrease the value to be set as the maximum or minimum current for charging. The purposes of protecting the device's battery and saving power can be both satisfied by setting the maximum and minimum currents. The setting element 4 can set the maximum and minimum currents for the connecting ports 31 individually or collectively in one operation.

Additionally, in the disclosed multi-port charging device, the charging states 9 further include a power-saving mode 95. When the current-detecting element 22 detects that the electronic device has entered its sleeping mode and is therefore in a power-saving state, the disclosed multi-port charging device 1 does not charge the electronic device. However, there is a chance that the electronic device has long stayed in its sleeping mode and its battery power finally comes to an extremely low level that may be adverse to the battery. For preventing such battery damage, the charging states further include a battery-protecting mode 96 in addition to the power-saving mode 95, so that when the current-detecting element 22 detects the electronic device in the power-saving state has its remaining power level lower than a bottom limit, such as 10% of its full power level, the charging section 3 automatically starts to charge, thereby securing the battery of the electronic device from damage caused by an extremely low power level.

In still another embodiment, when any of the connecting ports 31 in the charging section 3 is not connected to an electronic device, the vacant connecting port 31 has its charging state enter the power-saving mode, where the charging function is turned off, so as to save power consumption of the disclosed multi-port charging device 1 itself.

Now referring to FIG. 3, the disclosed multi-port charging device 1 further comprises a scanning module 8, which at least includes a scanning element 81 and a scanning indicator 82. The scanning element 81 serves to automatically scan the connecting ports 31 one by one in a periodic manner, so as to detect the charging state of each said connecting port 31, and show the port number and the charging current of the currently scanned connecting port 31 through the displaying element 42. The scanning indicator 82 serves to indicate that the scanning module 8 is performing automatic scanning. The interval of the scanning is programmable according to practical needs, and may cause the connecting ports 31 to be scanned every 5 seconds, 10 seconds, 30 seconds or 60 seconds automatically. With this function, the user is free from manually selecting the connecting ports 3 to be scanned through the controlling section 4, and monitoring the charging states of the ports can become more efficient.

Now referring to FIG. 2, the disclosed multi-port charging device 1 further comprises a switch module 7, which is at the same side of the body 2 as the power inlet port 5 is deposited. The switch module 7 includes a plurality of toggles 71, for switching the scanning module 8 among the automatic scanning function, the power-saving function for the power-saving mode 95, and the function for setting the maximum and minimum currents.

It is to be noted that, in another embodiment, the charging section 3 of the disclosed multi-port charging device 1 may further comprise a wireless charging element 33 for charging electronic devices 6 that support wireless charging wirelessly, so as to avoid the shortcomings and inconvenience related to wired charging or charging through other physical connections.

To sum up, the disclosed multi-port charging device 1 uses the connecting ports 31 to charge several electronic devices 6, and implements the lamp indicators 32 to show the real-time charging states of the charged electronic device. It also allows the user to select one or more or all of the connecting ports 31 through the controlling section 4 and to make the maximum and minimum charging currents shown in the controlling section 4, so that the user can well learn the charging states of the electronic devices without using an additional, external device. Thus, the disclosed multi-port charging device can not only charge multiple electronic devices simultaneously, but also show current charging states of the charged electronic devices, and provide different charging currents for the connecting ports of different charging states, thereby saving power effectively and protecting the charged electronic devices from being run down due to excessive or prolonged charging.

What is claimed is:

1. A multi-port charging device for charging plural electronic devices simultaneously, the multi-port charging device comprising:
  a body, containing therein a circuit hoard that is provided with a plurality of current-detecting elements thereon;
  a charging section, being deposited at one side of the body and including a plurality of connecting ports each of which is connected to one said electronic device to be charged, in which each said connecting port has a lamp indicator provided at one lateral thereof and is electrically connected to one said current-detecting element; and
  a power inlet port, being deposited at an opposite side of the body and configured to be connected to an external power source for supplying power to the multi-port charging device,
  wherein each said current-detecting element detects a charging current of one said electronic device, and feeds back a signal to the connected lamp indicator, so that the lamp indicator shows one of charging states according to the signal, in which the charging states at least include a fast charging mode, a slow charging mode, an off mode and a mis-connection mode; wherein the fast charging mode refers to outputting a first current in a first time, and the slow charging mode refers to outputting a second current in the first time, in which the first current is greater than the second current, while the off mode refers to in the first time outputting a third current that is smaller than the second current or equal to zero.

2. The multi-port charging device of claim 1, wherein the charging states further include a power-saving mode, so that when the current-detecting element detects that the electronic device is in a power-saving state, the multi-port charging device does not charge the electronic device.

3. The multi-port charging device of claim 2, wherein the charging states further include a battery-protecting mode in addition to the power-saving mode, so that when the current-detecting element detects that the electronic device in the power-saving state has a remaining power level lower than a bottom limit, the multi-port charging device automatically charges the electronic device, thereby preventing the electronic device from battery damage caused by low power.

4. A multi-port charging device for charging plural electronic devices simultaneously, the multi-port charging device comprising:

a body, containing therein a circuit board that is provided with a plurality of current-detecting elements thereon;

a charging section, being deposited at one side of the body and including a plurality of connecting ports each of which is connected to one said electronic device to be charged, in which each said connecting port has a lamp indicator provided at one lateral thereof and is electrically connected to one said current-detecting element; and a power inlet port, being deposited at an opposite side of the body and configured to be connected to an external power source for supplying power to the multi-port charging device;

wherein each said current-detecting element detects a charging current of one said electronic device, and feeds hack a signal to the connected lamp indicator, so that the lamp indicator shows one of charging states according to the signal, in which the charging states at least include a fast charging mode, a slow charging mode, an off mode and a mis-connection mode, and when one of the connecting ports of the charging section is not connected to one said electronic device, the multi-port charging device enters the vacant connecting port into the charging state of the power-saving mode, and disables charging thereof.

5. The multi-port charging device of claim 1, further comprising a controlling section, which has a setting element and a displaying element, wherein each said connecting port has a unique port number, so that the one of connecting ports is allowed to be selected by the setting element, and the displaying element then shows the port number of the selected connecting port and a charging current associated therewith.

6. The multi-port charging device of claim 5, wherein the setting element is further configured to set a maximum current and a minimum current for the selected connecting port.

7. The multi-port charging device of claim 5, further comprising a scanning module, which at least includes a scanning element and a scanning indicator, wherein the scanning element serves to perform automatic scanning on the connecting ports in a periodic manner, so as to automatically detect the charging state of each of the connecting ports; and show the port numbers and the charging currents of the scanned connecting ports through the displaying element, and the scanning indicator serves to indicate that the scanning module is performing the automatic scanning.

8. A multi-port charging device for charging plural electronic devices simultaneously, the multi-port charging device comprising:

a body, containing therein a circuit board that is provided with a plurality of current-detecting elements thereon;

a charging section, being deposited at one side of the body and including a plurality of connecting ports each of which is connected to one said electronic device to be charged, in which each said connecting port has a lamp indicator provided at one lateral thereof and is electrically connected to one said current-detecting element; and a power inlet port, being deposited at an opposite side of the body and configured to be connected to an external power source for supplying power to the multi-port charging device;

a switch module, which is deposited on the body and has a plurality of toggles, for switching between an automatic scanning function, a power-saving function and a function for setting a maximum current and a minimum current;

wherein each said current-detecting element detects a charging current of one said electronic device, and feeds back a signal to the connected lamp indicator, so that the lamp indicator shows one of charging states according to the signal, in which the charging states at least include a fast charging mode, a slow charging mode, an off mode and a mis-connection mode.

9. The multi-port charging device of claim 1, wherein the lamp indicators indicate different said charging states with different colors.

10. The multi-port charging device of claim 1, wherein the lamp indicator flashes for the fast charging mode and the slow charging mode, and constantly illuminates for the off mode, while it keeps dark for the mis-connection mode, in which the lamp indicator flashes more frequently for the fast charging mode than for the slow charging mode.

11. The multi-port charging device of claim 1, wherein all of the connecting ports have a universal serial bus (USB) interface, or some of the connecting ports have the USB interface, while the rest of the connecting ports have a Micro USB interface or are of a dock connector specification.

12. The multi-port charging device of claim 1, wherein the charging section further comprises a wireless charging element that enables the multi-port charging device to charge the electronic devices wirelessly.

\* \* \* \* \*